United States Patent Office 3,099,555
Patented July 30, 1963

3,099,555
REDUCTION OF URANIUM OXIDE
Robert J. Teitel, Midland, Mich., assignor to The Dow Chemical Company, Midland, Mich., a corporation of Delaware
No Drawing. Filed Aug. 17, 1960, Ser. No. 50,093
5 Claims. (Cl. 75—84.1)

The invention relates to the reduction of uranium oxide with magnesium and more particularly relates to an improvement in the method of separating the products of the reduction reaction.

Although magnesium may be used for the direct reduction of uranium from its oxide, the reduction is normally made from the tetrafluoride because of the relative ease of separating uranium from magnesium fluoride. In the direct reduction of the oxide with magnesium the magnesium oxide tends to remain dispersed throughout the reaction product and as uranium is relatively insoluble in magnesium there is no basis for separating the uranium from the magnesium oxide.

It has now been found that on heating uranium oxide together with molten magnesium under an inert atmosphere, filtering off excess magnesium, heating the residue with molten aluminum whereby uranium formed in the reduction reaction is taken up as an aluminum alloy and filtering the aluminum alloy, the said uranium is readily separated from magnesium oxide.

Uranium oxides which may be treated according to the present process include $UO_2$, $U_3O_8$, $UO_3$ and mixtures thereof, for example, a uranium ore concentrate, spent oxide fuel elements, materials containing iron and vanadium and the like.

In carrying out the improved process of the invention uranium oxide, preferably in powdered form, is heated together with at least a stoichiometric amount of magnesium. If it is desired to recover uranium either as the metal or as a high-uranium alminum alloy, about 2.5 to 25 times as much magnesium by weight as uranium is employed, as subsequently described in greater detail.

The reduction reaction may be carried out in a suitable reaction vessel, such as an elongated crucible, formed of impervious graphite, which is divided into an open top upper chamber and a closed bottom chamber by a porous graphite filter disc fitted transversely across the crucible, the filter disc forming the top wall of the bottom chamber. The filter disc may be a porosity equivalent to a graphite known as No. 60 grade (National Carbon Co.). The crucible is placed in a closed vessel provided with heating means, for example, an evacuable electric furnace. Such an electric furnace is provided with means to introduce and maintain an inert gas atmosphere therein.

If desired, the uranium oxide and pieces of magnesium may be placed in the upper chamber of the reaction vessel and heated together, or the magnesium may be melted and the uranium oxide slowly added to the molten metal. In any event it is desirable to bring about intimate contact between the oxide and the metal, as by stirring frequently or continuously, while they are at a temperature in the range of about 660° to about 800° C., but preferably at about 700° C. Reduction of the uranium oxide generally approaches completion within about 2 hours. The reaction mixture then consists of molten magnesium, and particulate solid magnesium oxide and metallic uranium which are both insoluble in the melt. If desired, the reaction mixture is next allowed to cool to about 650° C. to minimize the slight solubility of uranium in magnesium before the magnesium is removed from the mixture by filtration, e.g., by increasing the gas pressure above the open top upper crucible described, thus causing the still molten magnesium to pass through the filter disc and into the lower chamber of the crucible. Magnesium oxide, uranium, unreacted uranium oxide and any other material insoluble in magnesium are retained above the filter.

The residue of magnesium-insoluble material is then heated together with molten aluminum. The aluminum selectively takes up uranium to form a uranium-aluminum alloy. This is conveniently accomplished by adding to the residue on the filter an amount of aluminum by weight equal to about 5 to 20 times the weight of the uranium in the residue. While the pressure differential across the graphite filter is maintained at about zero, the crucible and contents are brought to a temperature of about 700° to 800° C. for about a half-hour. Stirring the mixture increases the rate of dissolution of the uranium in the aluminum. Then the mixture is again filtered as by increasing the gas pressure in the system about the upper chamber in the graphite crucible, preferably after cooling the mixture to about 650° C. The uranium-aluminum alloy is forced through the filter, leaving a residue of magnesium oxide and any unreacted uranium oxide on the filter.

While the so-formed uranium-aluminum alloy might find use directly as nuclear fuel, it is generally desirable to recover the uranium either as an aluminum alloy having higher uranium content, or as uranium metal.

To accomplish the recovery of the uranium as a more concentrated aluminum alloy the filtered aluminum alloy obtained as described above is heated together with magnesium. As a result, the uranium, which is quite insoluble in magnesium-aluminum alloy, is precipitated as an intermetallic compound of aluminum, e.g., $UAl_3$ or $UAl_2$. These intermetallic compounds of uranium may be recovered by filtration of the melt, or by allowing the contents of the crucible to solidify, then cutting off the settled bottom layer containing the uranium-aluminum compounds.

Using the apparatus described above it is convenient to pass the said molten filtrate from the upper chamber of the apparatus into the excess molten magnesium collected in the lower chamber to accomplish the precipitation of uranium-aluminum compound.

The uranium content of the uranium-aluminum compounds is recovered if desired, by washing the aluminum content from the compounds with magnesium or zinc or mixtures thereof, and finally distilling away the residual magnesium or zinc. The recovery of uranium from uranium-aluminum compounds is more fully described in my copending application, Serial No. 825,389, filed July 2, 1959, now U.S. Patent No. 3,053,650, issued September 11, 1962.

As an example of the process of the invention 10 grams of powdered $UO_2$ and 132 grams of magnesium were placed together in the upper part of a two-part graphite assembly disposed in the close fitting steel chamber of a muffle type electric furnace. The upper part of the assembly consisted of an elongated graphite filter sleeve which was closed at the lower end, having press fitted therein a filter disc formed of No. 60 grade graphite frit (National Carbon Co.). The filter sleeve was disposed above and supported by a catcher crucible formed of impervious graphite. A temperature resistant neoprene O-ring placed around the upper end of the filter sleeve sealingly engaged the surrounding steel chamber. Gas connections to the steel chamber both above and below the O-ring permitted pressure control in both the filter sleeve and the catcher crucible, the latter having holes in the upper part of its sidewall providing communication with the annular space around it.

The two-part graphite assembly was evacuated and purged of air and moisture and pressurized with argon to about 5 lbs. per square inch gage. The reaction mixture was then heated to and maintained at a temperature of 700° C. for 3½ hours, during which time it melted and was occasionally mixed. At the end of the reaction period the melt was allowed to cool to 655° C. The argon pressure in the catcher crucible was reduced to about 7 lbs. per square inch absolute pressure causing the molten metal phase in the filter sleeve to filter through into the catcher crucible.

The furnace temperature was then raised to 700° C. and 78.0 grams of aluminum were added to the residue above the filter by means of a probe. The melt was held for about one-half hour at 715° C. with mixing both by mechanical stirring and by gas sparging through the filter. Then the melt was allowed to cool to 675° C. and the argon pressure in the catcher crucible was reduced to 7 lbs. per square inch absolute to cause the molten aluminum alloy to filter through into the catcher crucible where it mixed with the molten filtrate previously deposited there. The catcher crucible and contents were allowed to cool slowly. After the apparatus reached room temperature, the solidified metal in the catcher crucible was recovered, sectioned and examined by metallographic and X-ray techniques. The solidified metal was found to consist of a settled bottom layer containing $UAl_3$ and the remainder of the solidified metal was a magnesium-aluminum alloy.

Among the advantages of the improved process of the invention are: (1) the purification generally obtained on processing an impure uranium oxide, and (2) the economy effected in reducing uranium oxide directly, avoiding the necessity of preparing $UF_4$.

I claim:

1. In the reduction of uranium oxide by the reaction thereof with molten magnesium whereby a reaction mixture containing uranium and magnesium oxide is formed, the process of separating said uranium from the reaction mixture as uranium-aluminum alloy which comprises: contacting said reaction mixture with molten aluminum whereby said uranium is taken up to form a molten uranium-aluminum alloy, and separating the uranium-aluminum alloy, while it is molten, from said magnesium oxide.

2. In the reduction of uranium oxide by the reaction thereof with molten magnesium whereby a reaction mixture containing uranium, magnesium oxide and unreacted magnesium is formed, the process of separating uranium from the reaction mixture as uranium-aluminum alloy which comprises: separating unreacted magnesium, while it is molten, from the reaction mixture leaving a residue of uranium and magnesium oxide, contacting said residue with molten aluminum whereby said uranium is taken up to form a uranium-aluminum alloy, and separating the uranium-aluminum alloy, while it is molten, from the said magnesium oxide.

3. In the preparation of uranium-aluminum alloy from uranium oxide the improved sequence of steps which comprises: heating together at an elevated temperature and under an inert atmosphere uranium oxide and at least the stoichiometric amount of magnesium whereby a reaction mixture containing magnesium oxide and uranium is formed, separating unreacted magnesium, while it is molten, from the reaction mixture leaving a residue containing uranium and magnesium oxide, contacting said residue with molten aluminum whereby said uranium is taken up as a molten uranium-aluminum alloy, and separating the uranium-aluminum alloy, while it is molten, from the said magnesium oxide in the residue.

4. In the preparation of uranium-aluminum alloy from uranium oxide in which the said oxide is reduced directly by magnesium, the improved sequence of steps which comprises: heating together under an inert atmosphere uranium oxide and at least the stoichiometric amount of magnesium whereby a reaction mixture containing uranium, magnesium oxide, and unreacted magnesium if formed; separating said unreacted magnesium, while it is molten, from the reaction mixture leaving a residue containing uranium and magnesium oxide; contacting said residue with molten aluminum whereby said uranium is taken up as a molten uranium-aluminum alloy; separating the uranium-aluminum alloy while it is molten, from the said magnesium oxide in the residue; heating molten magnesium together with the so-separated uranium-aluminum alloy whereby an intermetallic compound of uranium and aluminum is precipitated and a magnesium aluminum alloy is formed; and separating the so-precipitated intermetallic compound from the magnesium-aluminum alloy.

5. In the preparation of uranium-aluminum alloy from uranium oxide in which the said oxide is reduced directly by magnesium, the improved sequence of steps which comprises: heating together under an inert atmosphere uranium oxide and molten magnesium, the proportion of magnesium being by weight from 2.5 to 25 times the weight of the said uranium oxide, whereby a reaction mixture containing uranium, magnesium oxide and unreacted magnesium is formed; separating said unreacted magnesium, while it is molten, from the reaction mixture leaving a residue containing uranium and magnesium oxide; contacting said residue with molten aluminum, the proportion of aluminum being by weight from 5 to 20 times the weight of the uranium in the residue, whereby said uranium is taken up as a molten uranium-aluminum alloy; separating the uranium-aluminum alloy, while it is molten, from the said magnesium oxide in the residue; heating said separated unreacted magnesium together with the so-separated uranium-aluminum alloy whereby an intermetallic compound of uranium and aluminum is precipitated and a magnesium-aluminum alloy is formed; and separating the so-precipitated intermetallic compound from the magnesium-aluminum alloy.

References Cited in the file of this patent

UNITED STATES PATENTS

| | | |
|---|---|---|
| 1,728,942 | Marden | Sept. 24, 1929 |
| 2,934,425 | Knighton et al. | Apr. 26, 1960 |